US009817992B1

(12) United States Patent
Paczkowski et al.

(10) Patent No.: US 9,817,992 B1
(45) Date of Patent: Nov. 14, 2017

(54) SYSTEM AND METHOD FOR SECURE USIM WIRELESS NETWORK ACCESS

(71) Applicant: Sprint Communications Company L.P., Overland Park, KS (US)

(72) Inventors: Lyle W. Paczkowski, Mission Hills, KS (US); Robert L. Spanel, Overland Park, KS (US); Robert E. Urbanek, Overland Park, KS (US)

(73) Assignee: Sprint Communications Company LP., Overland Park, KS (US)

( * ) Notice: Subject to any disclaimer, the term of this patent is extended or adjusted under 35 U.S.C. 154(b) by 25 days.

(21) Appl. No.: 14/947,257

(22) Filed: Nov. 20, 2015

(51) Int. Cl.
| | |
|---|---|
| *G06F 21/62* | (2013.01) |
| *G06F 12/14* | (2006.01) |
| *H04L 29/06* | (2006.01) |
| *G06F 21/88* | (2013.01) |
| *H04W 12/04* | (2009.01) |
| *H04L 12/26* | (2006.01) |

(52) U.S. Cl.
CPC ...... *G06F 21/6218* (2013.01); *G06F 12/1416* (2013.01); *G06F 21/88* (2013.01); *H04L 43/10* (2013.01); *H04L 63/06* (2013.01); *H04L 63/08* (2013.01); *H04L 63/20* (2013.01); *H04W 12/04* (2013.01); *G06F 2212/1052* (2013.01); *G06F 2212/154* (2013.01)

(58) Field of Classification Search
CPC ....................................................... H04L 43/10
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 5,825,876 A * | 10/1998 | Peterson, Jr. | ........... G06F 21/10 |
| | | | 380/228 |
| 6,131,024 A | 10/2000 | Boltz | |

(Continued)

FOREIGN PATENT DOCUMENTS

JP  6171245 B2  8/2017

OTHER PUBLICATIONS

Notice of Allowance dated Jul. 6, 2017, U.S. Appl. No. 14/855,364, filed Sep. 15, 2015.

(Continued)

*Primary Examiner* — James Turchen

(57) ABSTRACT

A user equipment (UE). The UE comprises a memory module, wherein the memory module is one of a subscriber identity module (SIM), a universal integrated circuit card (UICC), a universal subscriber identity module (USIM), or a removable user identity module (R-UIM), wherein clock signals from a second clock component are input to the memory module. The memory module comprises an application stored in a trusted security zone in the second non-transitory memory, that when executed by the second processor in the trusted security zone, wherein the second operating system accesses the second processor to implement instructions for applications in the second operating system, wherein the trusted security zone provides hardware assisted trust, compares a first mobile equipment identifier (MEID) stored in the first non-transitory memory with a second MEID stored in the memory module.

17 Claims, 7 Drawing Sheets

(56) References Cited

U.S. PATENT DOCUMENTS

| | | | |
|---|---|---|---|
| 6,177,860 B1 | 1/2001 | Cromer et al. | |
| 6,219,712 B1 | 4/2001 | Mann et al. | |
| 6,222,463 B1 | 4/2001 | Rai | |
| 6,363,150 B1 | 3/2002 | Bhagavath et al. | |
| 6,389,403 B1 | 5/2002 | Dorak, Jr. | |
| 6,434,561 B1 * | 8/2002 | Durst, Jr. | H04N 1/33323 |
| 6,477,180 B1 | 11/2002 | Aggarwal et al. | |
| 6,507,869 B1 | 1/2003 | Franke et al. | |
| 6,507,904 B1 | 1/2003 | Ellison et al. | |
| 6,614,893 B1 | 9/2003 | Paiz | |
| 6,651,171 B1 | 11/2003 | England et al. | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,023,979 B1 | 4/2006 | Wu et al. | |
| 7,043,241 B1 | 5/2006 | Sladek et al. | |
| 7,069,234 B1 | 6/2006 | Cornelius et al. | |
| 7,127,541 B2 | 10/2006 | Govindarajulu et al. | |
| 7,366,806 B2 | 4/2008 | Milenkovic et al. | |
| 7,386,275 B2 | 6/2008 | Pirzada et al. | |
| 7,387,240 B2 | 6/2008 | Ziegler | |
| 7,519,824 B1 | 4/2009 | Peyravian et al. | |
| 7,552,467 B2 | 6/2009 | Lindsay | |
| 7,571,364 B2 | 8/2009 | Whetsel | |
| 7,574,382 B1 | 8/2009 | Hubert | |
| 7,650,645 B1 | 1/2010 | Langendorf et al. | |
| 7,716,720 B1 | 5/2010 | Marek et al. | |
| 7,761,558 B1 | 7/2010 | Jindal et al. | |
| 7,849,309 B1 * | 12/2010 | Brown | H04L 63/0876 713/162 |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,086,238 B1 | 12/2011 | Kosar | |
| 8,112,794 B2 | 2/2012 | Little et al. | |
| 8,190,919 B2 | 5/2012 | Natarajan et al. | |
| 8,204,480 B1 | 6/2012 | Lindteigen et al. | |
| 8,238,823 B2 | 8/2012 | Maugars et al. | |
| 8,271,336 B2 | 9/2012 | Mikurak | |
| 8,295,811 B1 | 10/2012 | Gailloux et al. | |
| 8,298,295 B2 * | 10/2012 | Aissi | G06F 21/88 726/34 |
| 8,316,237 B1 | 11/2012 | Felsher et al. | |
| 8,332,895 B2 | 12/2012 | Nathan et al. | |
| 8,332,953 B2 * | 12/2012 | Lemieux | G06F 21/88 726/26 |
| 8,402,543 B1 | 3/2013 | Ranjan et al. | |
| 8,413,229 B2 | 4/2013 | Mullick et al. | |
| 8,429,409 B1 | 4/2013 | Wall et al. | |
| 8,442,588 B2 | 5/2013 | Sims et al. | |
| 8,443,420 B2 | 5/2013 | Brown et al. | |
| 8,447,983 B1 | 5/2013 | Beck et al. | |
| 8,494,576 B1 | 7/2013 | Bye et al. | |
| 8,498,572 B1 | 7/2013 | Schooley et al. | |
| 8,504,097 B1 | 8/2013 | Cope et al. | |
| 8,542,833 B2 * | 9/2013 | Devol | G06F 21/552 380/259 |
| 8,566,183 B1 | 10/2013 | Bonar et al. | |
| 8,588,749 B1 | 11/2013 | Sadhvani et al. | |
| 8,590,012 B2 * | 11/2013 | Roy | H04L 63/102 726/12 |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,650,492 B1 | 2/2014 | Mui et al. | |
| 8,661,119 B1 | 2/2014 | Jindal et al. | |
| 8,667,607 B2 | 3/2014 | Paczkowski et al. | |
| 8,681,969 B1 | 3/2014 | Rodde et al. | |
| 8,707,056 B2 | 4/2014 | Felton | |
| 8,712,407 B1 | 4/2014 | Cope et al. | |
| 8,718,554 B2 | 5/2014 | Abel | |
| 8,719,586 B1 | 5/2014 | Paleja et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,787,873 B1 | 7/2014 | Hitt et al. | |
| 8,793,808 B2 | 7/2014 | Boccon-Gibod | |
| 8,797,875 B2 | 8/2014 | Garcia Martin et al. | |
| 8,811,971 B2 | 8/2014 | Corda et al. | |
| 8,826,015 B2 | 9/2014 | Lakshminarayanan et al. | |
| 8,831,998 B1 | 9/2014 | Cramer et al. | |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,868,898 B1 | 10/2014 | Van Hoof | |
| 8,881,977 B1 | 11/2014 | Paczkowski et al. | |
| 8,886,925 B2 | 11/2014 | Qureshi et al. | |
| 8,954,588 B1 | 2/2015 | Bertz et al. | |
| 8,984,592 B1 | 3/2015 | Paczkowski et al. | |
| 8,989,705 B1 | 3/2015 | Katzer et al. | |
| 9,015,068 B1 | 4/2015 | Bertz et al. | |
| 9,021,585 B1 | 4/2015 | Paczkowski et al. | |
| 9,027,102 B2 | 5/2015 | Katzer et al. | |
| 9,049,013 B2 | 6/2015 | Paczkowski et al. | |
| 9,049,186 B1 | 6/2015 | Paczkowski et al. | |
| 9,066,230 B1 | 6/2015 | Paczkowski et al. | |
| 9,069,952 B1 | 6/2015 | Paczkowski et al. | |
| 9,104,840 B1 | 8/2015 | Paczkowski et al. | |
| 9,118,655 B1 | 8/2015 | Paczkowski et al. | |
| 9,161,227 B1 | 10/2015 | Bye et al. | |
| 9,161,325 B1 | 10/2015 | Urbanek | |
| 9,171,243 B1 | 10/2015 | Cordes et al. | |
| 9,177,157 B2 | 11/2015 | Binder | |
| 9,183,412 B2 | 11/2015 | Bye et al. | |
| 9,183,606 B1 | 11/2015 | Paczkowski et al. | |
| 9,185,626 B1 | 11/2015 | Kunkel et al. | |
| 9,191,388 B1 | 11/2015 | Paczkowski et al. | |
| 9,191,522 B1 | 11/2015 | Krieger et al. | |
| 9,208,339 B1 | 12/2015 | Paczkowski et al. | |
| 9,210,576 B1 | 12/2015 | Cope et al. | |
| 9,215,180 B1 | 12/2015 | Bertz et al. | |
| 9,226,145 B1 | 12/2015 | Loman et al. | |
| 9,230,085 B1 | 1/2016 | Paczkowski et al. | |
| 9,253,589 B2 | 2/2016 | McCann et al. | |
| 9,268,959 B2 | 2/2016 | Paczkowski et al. | |
| 9,282,898 B2 | 3/2016 | McRoberts et al. | |
| 9,324,016 B1 | 4/2016 | Cordes et al. | |
| 9,374,363 B1 | 6/2016 | Paczkowski et al. | |
| 9,384,498 B1 | 7/2016 | Bertz et al. | |
| 9,443,088 B1 | 9/2016 | Bye et al. | |
| 9,454,723 B1 | 9/2016 | Cordes et al. | |
| 9,473,945 B1 | 10/2016 | Marquardt et al. | |
| 9,560,519 B1 | 1/2017 | McCracken, Jr. et al. | |
| 9,613,208 B1 | 4/2017 | Paczkowski et al. | |
| 9,712,999 B1 | 7/2017 | Cordes et al. | |
| 9,779,232 | 10/2017 | Paczkowski et al. | |
| 2001/0041591 A1 | 11/2001 | Carroll | |
| 2002/0002468 A1 | 1/2002 | Spagna et al. | |
| 2002/0007456 A1 | 1/2002 | Peinado et al. | |
| 2002/0035697 A1 | 3/2002 | McCurdy et al. | |
| 2002/0091569 A1 | 7/2002 | Kitaura et al. | |
| 2002/0095389 A1 | 7/2002 | Gaines | |
| 2002/0156911 A1 | 10/2002 | Croman et al. | |
| 2002/0166070 A1 | 11/2002 | Mualem et al. | |
| 2002/0174344 A1 | 11/2002 | Ting | |
| 2002/0181503 A1 | 12/2002 | Montgomery | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0045273 A1 | 3/2003 | Pyhalammi et al. | |
| 2003/0092435 A1 | 5/2003 | Boivin | |
| 2003/0093667 A1 | 5/2003 | Dutta et al. | |
| 2003/0110046 A1 | 6/2003 | Cofta | |
| 2003/0126225 A1 | 7/2003 | Camble et al. | |

(56) References Cited

U.S. PATENT DOCUMENTS

| | | |
|---|---|---|
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1* | 10/2005 | Deshpande ............ H04M 1/66 382/115 |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Carrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1* | 8/2007 | Kao .................. G06F 11/0709 714/4.2 |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1 | 11/2008 | Blaisdell |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1* | 11/2009 | Morel ................ G06K 7/10297 455/558 |
| 2009/0281947 A1 | 11/2009 | Erel |
| 2009/0289764 A1 | 11/2009 | Chiu |
| 2009/0300599 A1 | 12/2009 | Piotrowski |

(56) References Cited

U.S. PATENT DOCUMENTS

| | | |
|---|---|---|
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1* | 3/2010 | Aldera .................. H04L 63/102 726/1 |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1* | 11/2012 | Micali ................ G07C 9/00031 340/5.65 |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |

(56) References Cited

U.S. PATENT DOCUMENTS

| | | |
|---|---|---|
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1* | 5/2014 | Sharp .................. G06F 21/604 726/1 |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2015/0358455 A1* | 12/2015 | Mosher .................. H04W 4/22 455/404.1 |
| 2016/0004876 A1 | 1/2016 | Bye et al. |
| 2016/0142396 A1 | 5/2016 | McRoberts et al. |
| 2017/0026840 A1* | 1/2017 | Eyal ........................ H04L 43/10 |

OTHER PUBLICATIONS

Advisory Action dated Jun. 1, 2017, U.S. Appl. No. 13/860,338, filed Apr. 10, 2013.
FAIPP Pre-Interview Communication dated Apr. 27, 2017, U.S. Appl. No. 14/606,011, filed Jan. 26, 2015.
Notice of Allowance dated May 30, 2017, U.S. Appl. No. 14/596,218, filed Jan. 14, 2015.
Twin Connect—"User Guide for Windows"; 30 pages; dated 2013.
WiseGEEK, "What is a USB Dongle?," http://www.wisegeek.com/what-is-a-usb-dongle.htm, four pages, dated Jul. 25, 2017.
Decision on Appeal dated Sep. 15, 2017, U.S. Appl. No. 14/632,850, filed Feb. 26, 2015.
European Examination Report dated Sep. 20, 2017, EPC Serial No. 14775613.4, filed on Jul. 8, 2015.
Notice of Allowance dated Jul. 28, 2017, U.S. Appl. No. 13/860,338, filed Apr. 10, 2013.
Notice of Allowance dated Aug. 7, 2017, U.S. Appl. No. 14/606,011, filed Jan. 26, 2015.
Paczkowski, Lyle W., et al., "System and Method for Secure USIM Wireless Network Access," filed Sep. 29, 2017, U.S. Appl. No. 15/719,813.
Marquardt, Ronald R., et al., "Data Link Layer Trust Signaling in Communication Network," filed Jul. 11, 2017, U.S. Appl. No. 15/646,842.

* cited by examiner

US 9,817,992 B1

SYSTEM AND METHOD FOR SECURE USIM WIRELESS NETWORK ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may authenticate to a cell tower using a wireless communication identifier and/or additional authentication credentials that are stored in a memory module on the electronic device. The memory module may be one of a subscriber identity module (SIM), a universal integrated circuit card (UICC), a universal subscriber identity module (USIM), a removable user identity module (R-UIM), or some other type of memory module.

SUMMARY

In an embodiment, a user equipment (UE) is disclosed. The UE comprises a radio transceiver, a first non-transitory memory, a first processor, a first operating system, a first clock component, and a memory module, wherein the memory module is one of a subscriber identity module (SIM), a universal integrated circuit card (UICC), a universal subscriber identity module (USIM), or a removable user identity module (R-UIM), wherein clock signals from a second clock component are input to the memory module. The memory module comprises a second non-transitory memory, a second processor, a second operating system, and an application stored in a trusted security zone in the second non-transitory memory, that when executed by the second processor in the trusted security zone, wherein the second operating system accesses the second processor to implement instructions for applications in the second operating system, wherein the trusted security zone provides hardware assisted trust, compares a first mobile equipment identifier (MEID) stored in the first non-transitory memory with a second MEID stored in the memory module. Responsive to the first MEID not matching the second MEID, the application further blocks access of applications outside the memory module to the radio transceiver and periodically examines whether a ping message is received associated with the second MEID from a server in a network of a service provider associated with the UE. Responsive to no such messages being received from the server within a predefined period of time, the application further blocks access of applications outside the memory module to the radio transceiver, wherein counting of the period of time is based on clock signals from the second clock component.

In an embodiment, a method of examining whether a user equipment (UE) has been stolen is disclosed. The method comprises periodically transmitting, by an application, a message to a server associated with a lost-and-stolen database to inquire whether the UE is stolen, wherein the application is stored in a trusted security zone in a dedicated non-transitory memory of a subscriber identity module (SIM) on the UE, wherein the SIM comprises a dedicated processor and a dedicated operating system, wherein clock signals from a dedicated clock component are input to the SIM, wherein the trusted security zone provides hardware assisted trust. The method further comprises responsive to a reply from the server indicating that the UE is lost, changing a network access key of the UE, wherein the network access key grants network access to the UE, and responsive to no reply from the server within a predefined period of time, changing the network access key of the UE, wherein the counting of the period of time is based on the clock signals from the dedicated clock component.

In an embodiment, a method of parental monitoring by a user equipment (UE) is disclosed. The method comprises monitoring, by a monitor application, activities of applications outside a subscriber identity module (SIM) on the UE, wherein the monitor application is stored in a trusted security zone in a dedicated non-transitory memory of the SIM, wherein the SIM comprises a dedicated processor and a dedicated operating system, wherein clock signals from a dedicated clock component are input to the SIM, and wherein the trusted security zone provides hardware assisted trust. The method further comprises responsive to an input to the UE via an application outside the SIM to connect to a website that is on a blacklist stored on the UE, blocking, by the monitor application, link of the application to a radio transceiver of the UE to access the blacklisted website.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
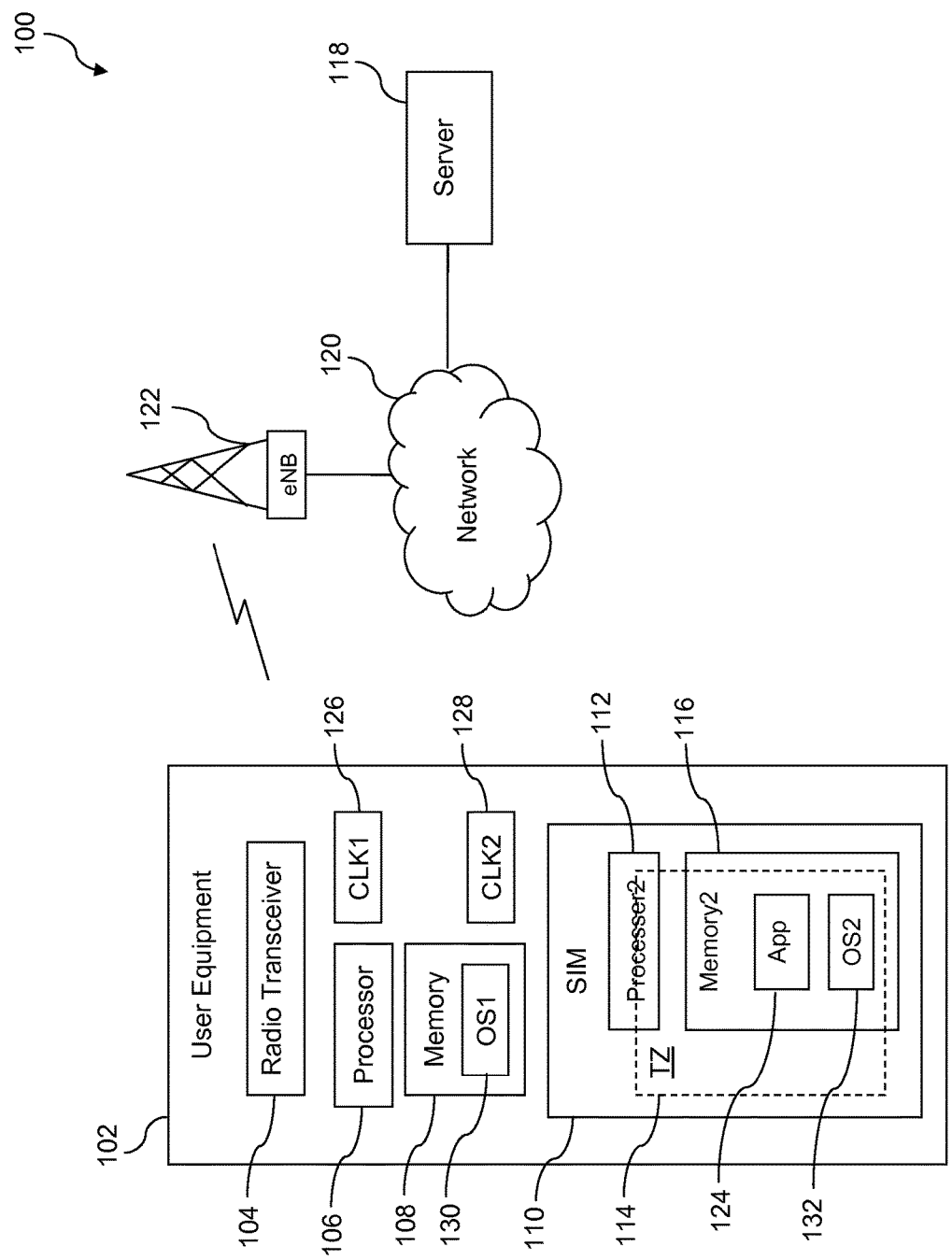
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current memory modules that are used for storing identifying information and authentication credentials on a user equipment (UE) may be vulnerable and lacking potentially beneficial tools for independent operation. A typical example of a memory module may be a removable subscriber identity module (SIM) and the removable SIM may be a smart card. Also, it may only entail moderate efforts for entities with malicious intent to hack or root the memory module. When a memory module is hacked or rooted, the memory module may be taken over and unauthorized access may be made to the memory module. When a user equipment is hacked or rooted, the operating system of the user equipment may be taken over and unauthorized access may be made to the user equipment including the memory module. Thus, reliable implementation of an advanced memory module that suits today's development of electronic hardware and software technologies and comprises tools for independent operation may be beneficial. For example, an autonomous memory module may be beneficial for its independence characteristics. The present disclosure teaches a system and method for hardware root of trust and trustlet implementation of a memory module on a user equipment.

As taught herein, a UE may comprise a first memory, a first processor, a first operating system, a first clock component, and a memory module such as SIM. The SIM may comprise a second memory, a second processor, and a second operating system. In an embodiment, a trusted security zone on the UE may comprise at least part of the second processor and the second memory. The trusted security zone provides hardware assisted trust. To be specific, the trusted security zone provides the UE with a hardware root of trust, a secure execution environment for applications, and secure access to peripherals. In another embodiment, the UE may comprise no trusted security zone. While a SIM is used in the role of memory module in a preferred embodiment, the teachings of the present disclosure may also be extended to other memory modules such as a universal integrated circuit card (UICC), a universal subscriber identity module (USIM), or a removable user identity module (R-UIM).

Clock signals from a second clock component may be input to the SIM. The second clock component may be isolated from the first clock component and the first processor. Thus, the first processor may not halt or otherwise tamper with the second clock component. Power may be input to the SIM through a dedicated power line so that as long as the dedicated power line is active, the SIM may be on, regardless of whether the rest of the UE is on. The second memory, the second processor, the trusted security zone, the second operating system, clock signals from the second clock component, and the dedicated power line makes the SIM an autonomous entity, independent from the rest of the UE and thus isolates the SIM from the rest of the UE. This may be helpful when the UE is rooted or hacked. Said in other words, this independence of the SIM decouples it from hacking of the UE.

A monitor application may be stored in the trusted security zone and may be executed by the second processor in the trusted security zone. In the case where the UE comprises no trusted security zone, the monitor application may be stored in the memory module and may be executed by the second processor. The monitor application may perform a variety of functions to manage security and/or control related applications of the UE. For example to determine whether or not the UE has been hacked or rooted, the monitor application may compare a first mobile equipment identifier (MEID) stored in the first memory with a second MEID stored in the SIM. The comparison may be performed periodically. When the first MEID does not match the second MEID, the monitor application may determine that the UE has been rooted and may block access of applications outside the SIM to a radio transceiver of the UE, thus blocking voice and data communication.

This may especially benefit today's smart phone leasing business model. In current systems, when a smart phone leased from a wireless communication service provider is hijacked or rooted, the user of the smart phone may stop paying the wireless communication service provider the leasing fee while continuing to use the smart phone. For example, the user may reconfigure the rooted phone for use on a different wireless service provider's network under their subscription plan, without paying the leasing fee while getting a free phone. The implementation of the monitor application in this disclosure may prevent this from happening or at least prevent the UE from obtaining cellular wireless communication service. A SIM with the current technologies would be compromised when the associated UE is compromised (hijacked or rooted) while a SIM as an autonomous entity implemented with technologies in the present disclosure will not be compromised even when the associated UE is compromised. Thus, the monitor application stored inside the SIM would still detect it when the UE is hijacked or rooted and block access of applications outside the SIM to the radio transceiver of the UE.

Additionally, the monitor application may periodically examine whether a ping message is received associated with the second MEID from a server in a network of a communications service provider associated with the UE. When no such messages are received from the server within a predefined period of time, the monitor application may also determine that the UE has been rooted and may block access of applications outside the SIM or outside the trusted security zone to the radio transceiver. Counting of the period of time may be based on clock signals from the second clock component. A monitor application implemented with the current technologies could be tricked to believe that a ping message is received periodically even when the associated UE is compromised (hijacked or rooted) while a monitor application within the SIM as an autonomous entity implemented with technologies in the present disclosure will not be tricked when the associated UE is compromised. Thus, the monitor application stored inside the SIM will detect it when no ping is received, determine that the UE has been rooted, and block access of applications outside the SIM to the radio transceiver of the UE.

To determine whether or not the UE is lost or stolen, the monitor application may periodically transmit an inquiry to a lost-and-stolen server associated with a lost-and-stolen database. The lost-and-stolen database may be a national database that stores information related to lost or stolen UEs. For example, a lost UE may be added to a list maintained by the lost-and-stolen database or the lost-and-stolen server when a user of the UE reports that to the lost-and-stolen server.

When a reply is received at the UE from the lost-and-stolen server indicating that the UE is lost, the monitor application may change a network access key of the UE. A network access key may be provided by the UE to a network for network access request and/or grant. Each UE may be assigned with a specific network access key by a communications service provider associated with the UE. When the specific network access key is changed, the UE may be denied access to the network. When the rich environment tries to access the network, it may request the SIM to provide credentials such as the network access key to the network. The rich environment may be the operating environment of the UE that is outside the trusted security zone or a trusted execution environment. When no reply is received from the lost-and-stolen server within a predefined period of time, the monitor application may determine that the UE has been stolen or lost and may also change the network access key of the UE. The counting of the period of time may be based on the clock signals from the second clock component. The monitor application within the SIM as an autonomous entity implemented with technologies in the present disclosure will not be compromised even if the UE is compromised. Thus, the monitor application stored inside the SIM will detect when no reply is received, determine that the UE is lost, and change the network access key.

The current parental control on a user equipment is typically implemented by an application that is downloaded by a user of the user equipment after the production at the original equipment manufacturer (OEM) and configuration of the UE at the communications service provider retail store. The issue with this type of downloaded applications is that the application usually has very limited control over the user equipment and may be easily compromised itself. Additionally, in the current disclosure, parental control may be realized in an autonomous way on the user equipment. The monitor application may monitor activities of applications outside the SIM on the UE. When an input to the UE via an application outside the SIM is detected by the monitor application to connect to a website that is on a blacklist stored on the UE, the monitor application may block link of the application to the radio transceiver to access the blacklisted website. Such functions may be used not only in parental control, but also in business control or another type of activity control on applications of a UE. The monitor application within the SIM as an autonomous entity implemented with technologies in the present disclosure will not be compromised even if the UE is compromised and thus the monitor application will detect it when an input to the UE via an application outside the SIM to connect to a website that is on a blacklist stored on the UE. Therefore, the monitor application in the present disclosure may really perform parental control or business control.

The form of the SIM may not affect the functionality described in this disclosure. In an embodiment, the SIM may be a physical SIM or a virtual SIM. A virtual SIM may be a mobile phone number provided by a wireless communication service provider that does not rely upon a physical SIM to connect phone calls to a UE. For example, the customary services of the physical SIM may be provided by a software application—a virtual SIM—executing at least partly in a trusted security zone. For further details about the virtual SIM, see U.S. Pat. No. 9,161,325, issued Oct. 13, 2015, entitled "Subscriber Identity Module Virtualization," by Robert E. Urbanek, et al., which is hereby incorporated by reference in its entirety. When the SIM is a physical SIM, it may be a removable SIM such as a separate chip, or an embedded SIM. When the SIM is an embedded SIM, the SIM may be integrated into an application chip or a modem chip on a mother board of the UE.

Other applications of the SIM in this disclosure may also be feasible. For example, the SIM may comprise a multi-profile space in the trusted security zone, for example for different communications service providers. A user of the UE may choose from the multiple profiles a profile to use through a trustlet or applet. Each profile may correspond to a subscription account with a specific wireless communication identifier such as a phone number. For example, one identifier may be associated with personal usage and another identifier may be associated with business usage; one identifier may be associated with a first wireless communication service provider and another may be associated with a second wireless communication service provider. The UE may have been provisioned for multiple wireless communication service providers in the case the profiles are associated with more than one wireless communication service provider. The space may further comprise empty space or empty containers to store future profiles. In an embodiment, the SIM may make the process of changing between production and lab keys less difficult. For example, production keys and lab keys may both be securely stored in the trusted security zone on the SIM but may be selected for production and lab scenarios based on predefined rules. Biometric recognition may be implemented with the SIM to identify the correct user of the UE while the biometric information of the user may be stored in the trusted security zone.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a plurality of user equipments (UEs) 102 and a server 118. The UE 102 may alternatively be referred to in some contexts as a mobile communication device. The server 118 may be in a network of a communications service provider associated with the UE 102. The UE 102 may comprise a radio transceiver 104, a processor 106, a memory 108, and a subscriber identity module (SIM) 110. The SIM 110 may comprise a processor2 112 and a memory2 116. In one embodiment, a trusted security zone 114 on the UE 102 may comprise at least part of the processor2 112 and the memory2 116. The trusted security zone 114 may comprise an application 124. In another embodiment, the UE 102 may comprise no trusted security zone.

The UE 102 may be configured to use a radio transceiver to establish a wireless communication link with an enhanced Node B (eNB) 122, and the eNB 122 may communicatively couple the UE 102 to a network 120. The UE 102 may use a network access key to complete an authentication process with the eNB 122 before the eNB 122 will provide a communication link to the UE 102. The eNB 122 may alternatively be referred to in some contexts as a base transceiver station (BTS) or a cell tower. The server 118 may also be communicatively coupled to the network 120. The network 120 may comprise any combination of private and public networks.

It is understood that the system 100 may comprise any number of UEs 102, any number of servers 118, and any number of eNBs 122. The collectivity of eNBs 122 may be said to comprise a radio access network (RAN), in that these eNBs 122 may provide a radio communication link to the UEs 102 to provide access to the network 120. The radio transceiver of the UE 102 may communicate with the eNB 122 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

While a user equipment is used in the role of UE 102 in another embodiment, the teachings of the present disclosure may also be extended to other network/communications capable devices such as a laptop computer, a notebook computer, a tablet computer, a smart phone, a personal digital assistant (PDA), a media player, a headset computer, a wearable computer, a game console, an Internet digital media streaming device, a television, a set top box, a portable storage device, a hotspot, a 2.5 Wi-Fi translator, an Internet of Things (IoT) device, or another network/communications capable device. In an embodiment, the UE 102 may have other components (not shown) such as a near field communication (NFC) radio transceiver, a short range radio transceiver such as a wireless local area network radio transceiver, or other components.

The UE 102 may comprise a first operating system, OS1 130, and a first clock component, CLK1 126. While a SIM 110 is used in the role of a memory module in one embodiment, the teachings of the present disclosure may also be extended to other memory modules such as a universal integrated circuit card (UICC), a universal subscriber identity module (USIM), or a removable user identity module (R-UIM). Clock signals from a second clock component, CLK2 128, may be input to the SIM 110. The CLK2 128 may be independent of the CLK1 126 and of the processor 106. The SIM 110 may comprise a second operating system, OS2 132. The independent second clock 128 and second operating system 132 may reduce the opportunity for a rooted UE 102 to be able to compromise the functionality of the SIM 110.

In an embodiment, the SIM 110 may be a physical SIM or a virtual SIM. When the SIM 110 is a physical SIM, it may be a removable SIM such as a separate chip, or an embedded SIM. When the SIM 110 is an embedded SIM, the SIM 110 may be integrated into an application chip or a modem chip on a mother board of the UE 102. When the SIM 110 is integrated into a modem chip of the UE 102, the SIM 110 may block access of applications outside the SIM 110 or the trusted security zone 114 to the radio transceiver 104 so that voice calls and data calls made by the applications outside the SIM 110 may be blocked. Power may be input to the SIM 110 through a dedicated power line so that as long as the dedicated power line is active, the SIM 110 is on, regardless of whether the rest of the UE is on. The power is not controlled by the processor 106.

The application 124 stored in the trusted security zone 114 may be executed by the processor2 112 in the trusted security zone 114. In the embodiment where the UE 102 comprises no trusted security zone, the application 124 may be stored in the SIM 110 and may be executed by the processor2 112. The application 124 may perform a variety of functions to manage security and/or control related applications of the UE 102. For example, the application 124 may determine periodically whether the UE 102 has been rooted or hacked by unauthorized entities and/or take further action based on the determination. The application 124 may examine periodically whether the UE 102 is stolen or lost and/or take action based on the result of the examination. Additionally, the application 124 may monitor application activities of the UE 102 according to parental control or enterprise control policies stored in the SIM 110.

To determine whether or not the UE 102 is rooted, the application 124 may compare a first equipment identity of the UE 102, for example a first mobile equipment identifier (MEID), stored in the memory 108 with a second equipment identity of the UE 102, for example a second MEID, stored in the trusted security zone 114 of the SIM 110. When the first MEID does not match the second MEID, the UE 102 may be determined to have been rooted. The application 124 may then take action to prevent the UE 102 from being misused or prevent malicious applications to be executed on the UE 102. For example, the application 124 may block access of applications outside the SIM 110 to the radio transceiver 104 and thus blocks voice calls and data calls made by the applications outside the SIM 110.

This function may be useful when a UE 102 leased from a wireless communication service provider is hijacked or rooted by a user of the UE 102 wishing to continue using the leased UE 102 without having to pay a leasing fee. The user of the UE 102 may have to bring in the UE 102 and pay the balance of a service bill to have communication ability of the UE 102 restored after the UE is determined to have been rooted and thus blocked from radio transceiver 104 access, hence is unable to make voice or data calls. The SIM 110 as an autonomous entity implemented with technologies in the present disclosure will not be compromised even when the UE 102 is compromised. Thus, the application 124 stored inside the SIM 110 would still detect it when the UE 102 is hijacked or rooted and block access of applications outside the SIM 110 to the radio transceiver 104 of the UE 102.

Alternatively or additionally, the application 124 may periodically examine whether or not a ping message associated with the second MEID is received from the server 118. When no such messages are received from the server 118 within a predefined period of time, the application 124 may determine that the UE 102 has been rooted. Counting of the period of time may be based on clock signals from the CLK2 128. Without the CLK2 128, when the UE 102 is rooted by an unauthorized entity, the CLK1 126 may also be halted, altered, or manipulated in another way by the unauthorized entity. Since the CLK2 128 is independent of the CLK1 126 and of the processor 106, even if the UE 102 is rooted and the processor 106 is taken over by an unauthorized entity, the CLK2 128 will not be manipulated by the unauthorized entity. The application 124 may then take action to prevent the UE 102 from being misused. For example, the application 124 may block access of applications outside the SIM 110 to the radio transceiver 104 and/or change the first MEID stored in the memory 108 so that the first MEID would not match the second MEID.

To determine whether or not the UE 102 is stolen or lost, the application 124 may periodically transmit a message or an inquiry to a lost-and-stolen server (not shown) associated with a lost-and-stolen database. The lost-and-stolen database may be a national database that stores information of lost or stolen UEs 102. For example, when a UE is lost, a user of the UE may register online to indicate that the UE is lost. That information may be stored in the national lost-and-stolen database.

When a reply is received at the UE 102 from the lost-and-stolen server indicating that the UE 102 is lost, the application 124 may change a network access key of the UE 102. In an embodiment, the network access key may be provided by the UE 102 to a network for network access request and/or grant. On the other hand, when no reply is received from the lost-and-stolen server within a predefined period of time, the application 124 may also change the network access key of the UE 102. The counting of the period of time may be based on the clock signals from the CLK2 128.

The message may be transmitted to the lost-and-stolen server periodically using a dedicated trusted communication channel or a dedicated secure communication channel via the radio transceiver 104 of the UE 102. Trusted computation and/or trusted communication is based on the hardware assisted security that reduces the ability of nefarious software or corrupt devices to write, read, or otherwise access trusted memory, trusted processing, or trusted messages. The SIM 110 or the trusted security zone 114 has an independent path to the radio transceiver 104 and this independent path may not be blocked by the processor 106. For example, access of applications stored outside the trusted security zone 114 to the radio transceiver 104 may be blocked by the application 124 while the message is being transmitted by the radio transceiver 104. The dedicated secure communication channel may utilize a dedicated communication protocol stack.

Additionally, the application 124 may monitor activities of applications outside the SIM 110 or outside the trusted security zone 114 on the UE 102, for example for parental control or business control purposes. Parental control or business control policies may be stored in the trusted security zone 114. For example, a parental control policy may prohibit texting in restricted time periods. In case of an input to the UE 102 via an application outside the SIM 110 or the trusted security zone 114 to connect to a website that is on a blacklist stored on the UE 102, the application 124 may block link of the application to the radio transceiver 104 to access the blacklisted website.

Figure 2:
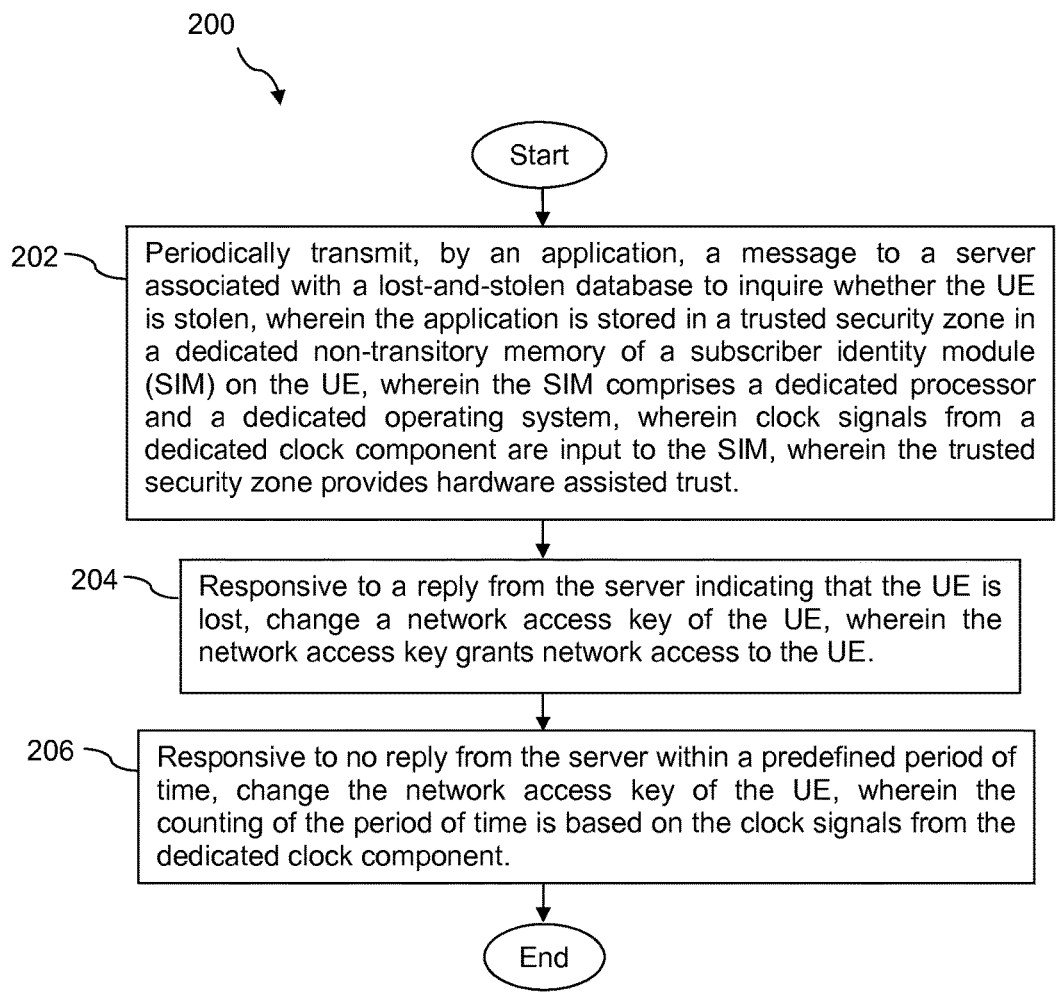
FIG. 2 is a flow chart illustrating a method according to an embodiment of the disclosure.

Turning now to FIG. 2, a method 200 is described. At block 202, a message is periodically transmitted by an application to a server associated with a lost-and-stolen database to inquire whether the UE is stolen, wherein the application is stored in a trusted security zone in a dedicated non-transitory memory of a subscriber identity module (SIM) on the UE, wherein the SIM comprises a dedicated processor and a dedicated operating system, wherein clock signals from a dedicated clock component are input to the SIM, wherein the trusted security zone provides hardware assisted trust. For example, a message may be transmitted periodically by the application 124 to a lost-and-stolen server associated with a national lost-and-stolen database to inquire whether or not the UE 102 is stolen or lost.

At block 204, responsive to a reply from the server indicating that the UE 102 is lost, a network access key of the UE 102 is changed, wherein the network access key is used by the UE 102 to complete an authentication process with the eNB 122 before the eNB 122 will provide a communication link to the UE 102. At block 206, Responsive to no reply from the server within a predefined period of time, the network access key of the UE 102 is changed, wherein the counting of the period of time is based on the clock signals from the dedicated clock component. When the network access key is changed, the UE 102 cannot make voice calls or data calls and the user of the UE 102 must bring the UE 102 in to a retail store or service center to have the issue resolved. If the leasing agreement has been violated in some way the UE 102 may be confiscated or the user may need to pay delinquent leasing fees and a service fee for restoration of service to the UE 102.

Figure 3:
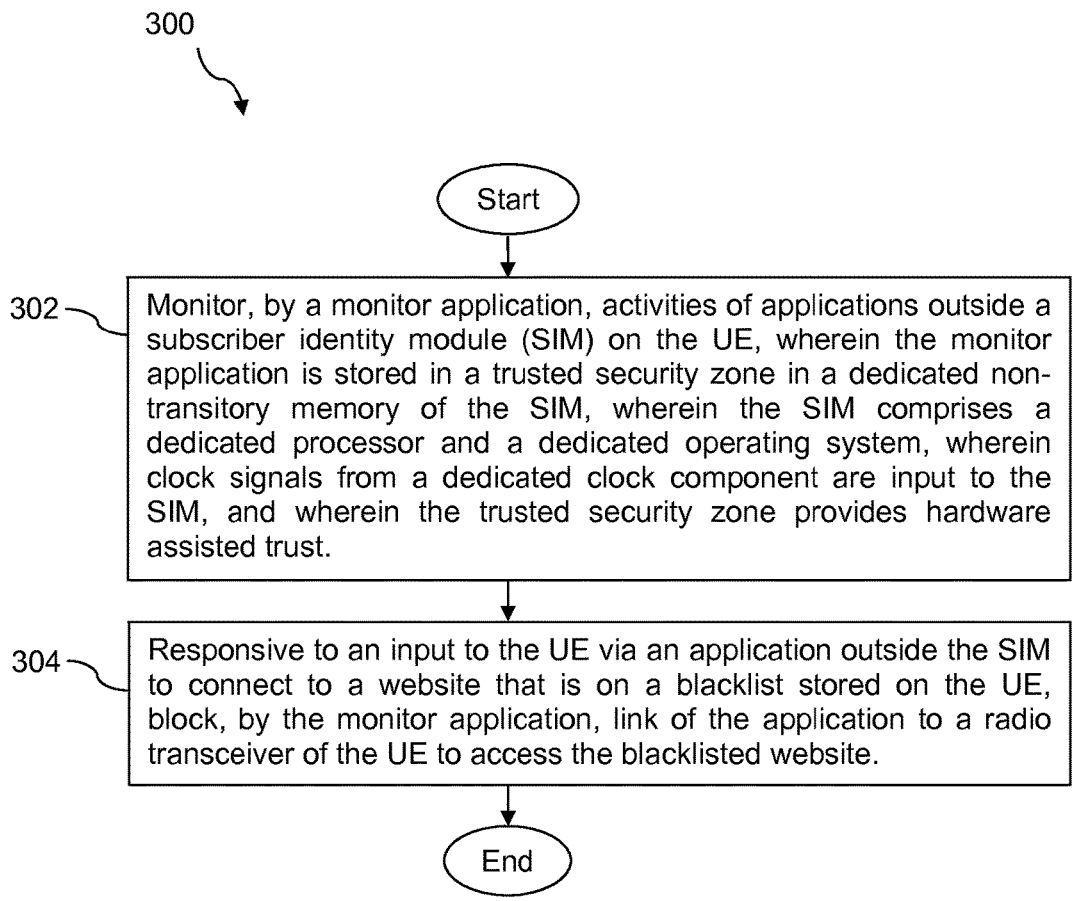
FIG. 3 is a flow chart illustrating another method according to an embodiment of the disclosure.

Turning now to FIG. 3, a method 300 is described. At block 302, activities of applications outside a subscriber identity module (SIM) 110 on the UE 102 are monitored by a monitor application 124, wherein the monitor application 124 is stored in a trusted security zone 114 in a dedicated non-transitory memory 116 of the SIM 110, wherein the SIM 110 comprises a dedicated processor2 112 and a dedicated operating system, wherein clock signals from a dedicated clock component are input to the SIM 110, and wherein the trusted security zone 114 provides hardware assisted trust. At block 304, responsive to an input to the UE 102 via an application outside the SIM 110 to connect to a website that is on a blacklist stored on the UE 102, block, by the monitor application 124, link of the application to a radio transceiver 104 of the UE 102 to access the blacklisted website.

Figure 4:
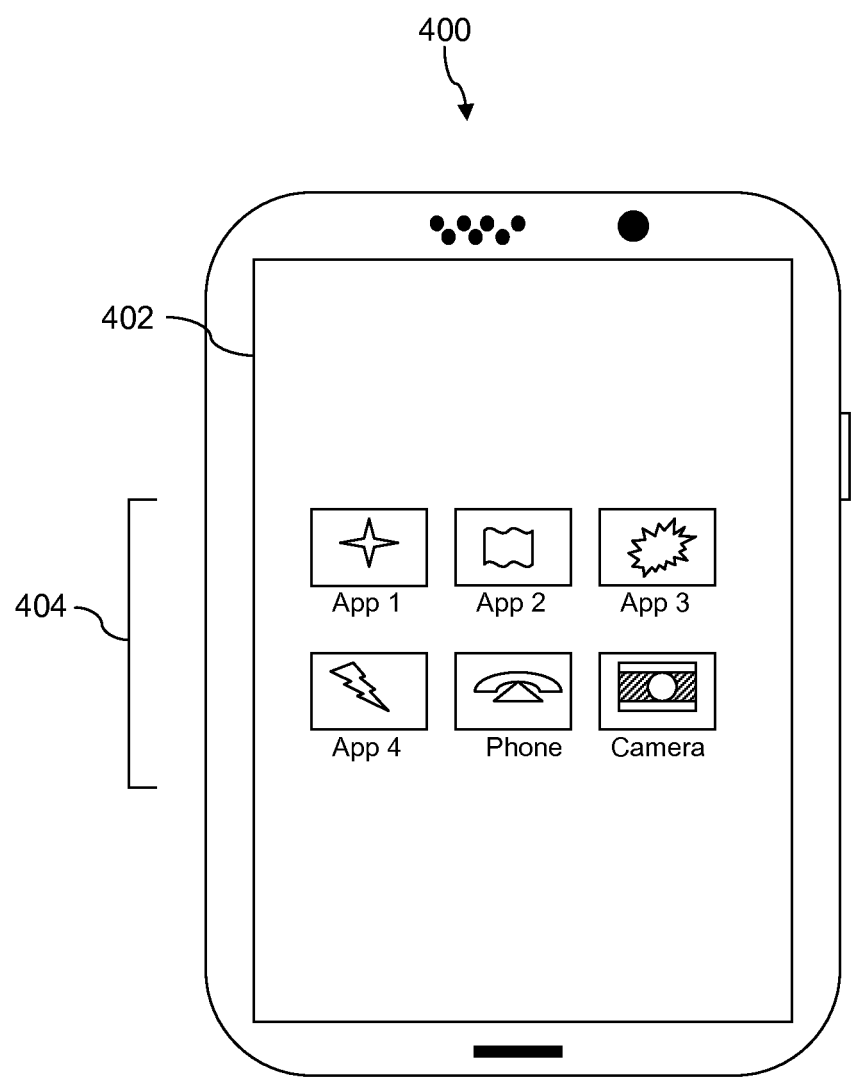
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
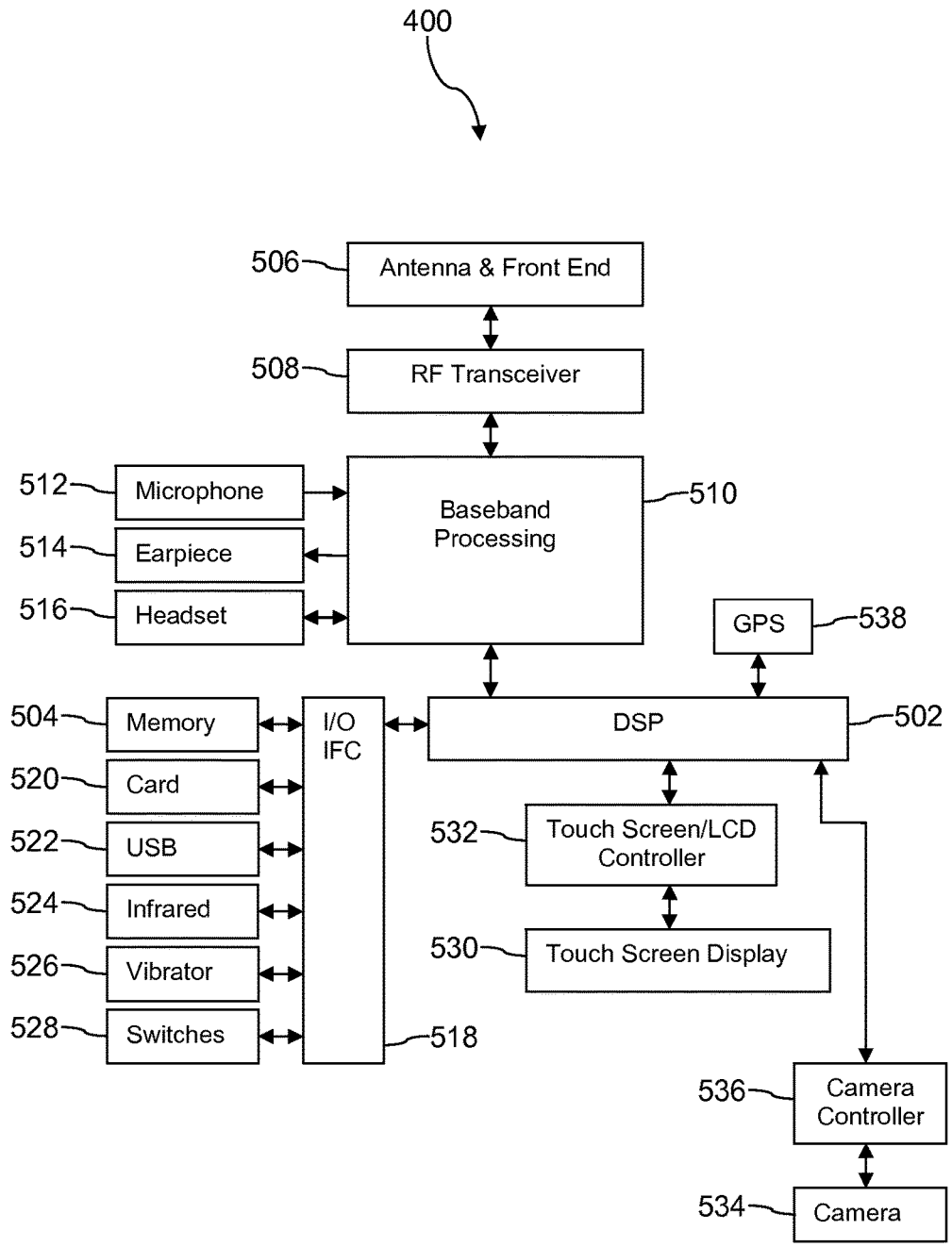
FIG. 5 is a block diagram of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
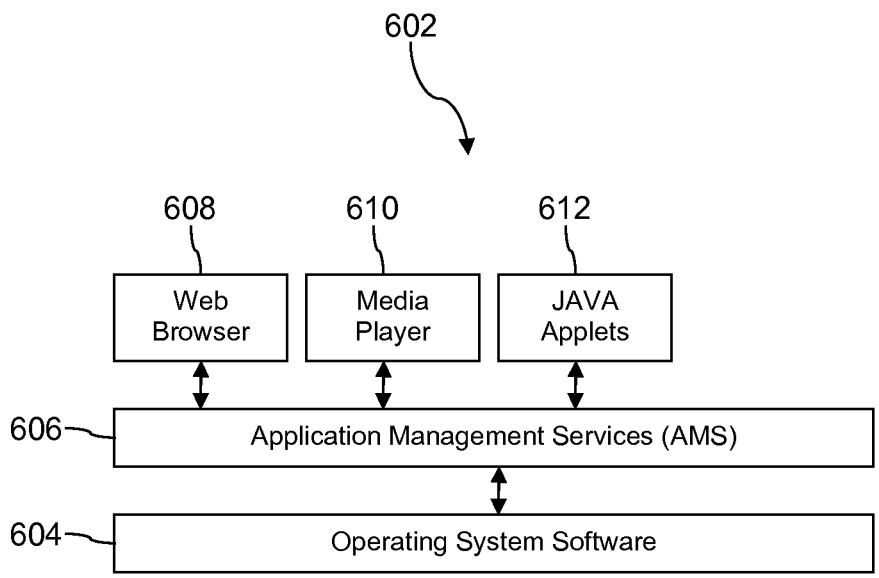
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
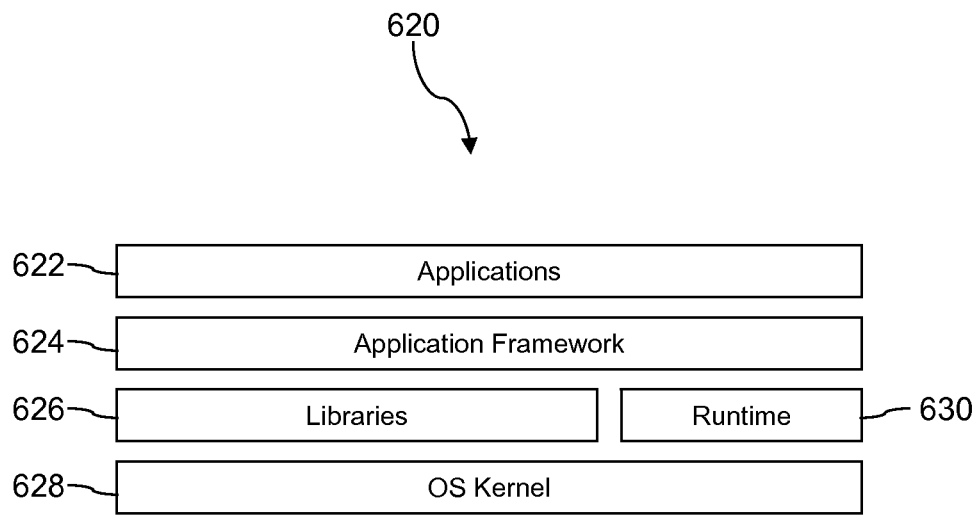
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
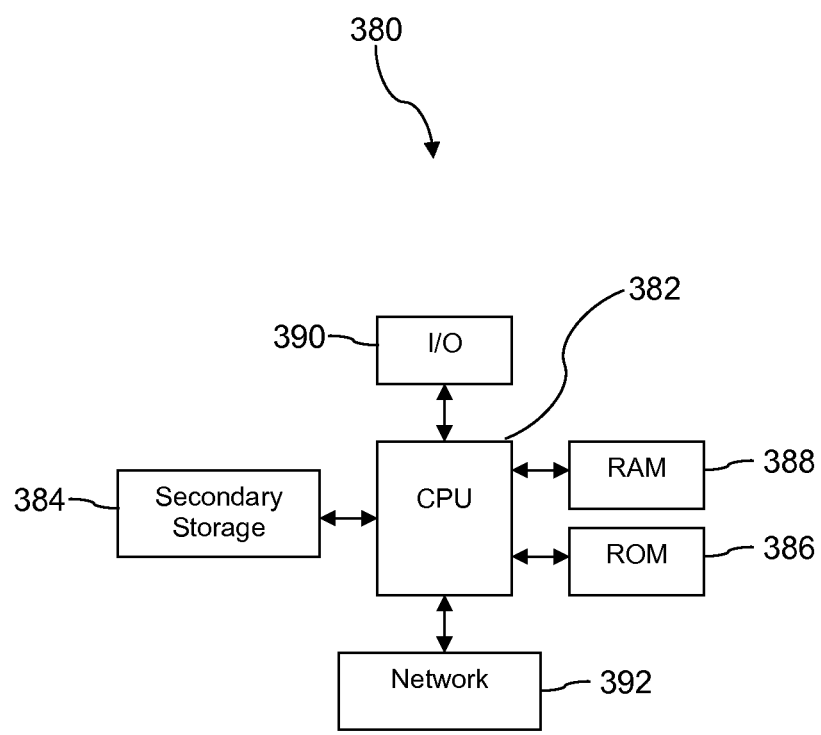
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a radio transceiver;
a first non-transitory memory;
a first processor;
a first operating system;
a first clock component; and
a memory module that is independent of and isolated from the UE by receiving a power input through a dedicated power line and receiving clock signals as an input from a second clock component that is isolated from the first clock component and the first processor, wherein the memory module is on as long as the dedicated power line is active regardless of whether the rest of the UE is on, and wherein the memory module is one of a subscriber identity module (SIM), a universal integrated circuit card (UICC), a universal subscriber identity module (USIM), or a removable user identity module (R-UIM), the memory module comprising:
a second non-transitory memory,
a second processor,
a second operating system, and
an application stored in a trusted security zone in the second non-transitory memory that, when executed by the second processor in the trusted security zone, wherein the application executes in the context of the second operating system, wherein the trusted security zone provides hardware assisted trust,
compares a first mobile equipment identifier (MEID) stored in the first non-transitory memory with a second MEID stored in the memory module,
responsive to the first MEID not matching the second MEID, blocks access of applications outside the memory module to the radio transceiver,
periodically examines whether a ping message is received associated with the second MEID from a server in a network of a service provider associated with the UE, and
responsive to no such ping messages being received from the server in the network within a predefined period of time based on clock signals from the second clock component, blocks access of applications outside the memory module to the radio transceiver.

2. The user equipment of claim 1, wherein the memory module is removable.

3. The user equipment of claim 1, wherein the memory module is integrated in a motherboard of the UE.

4. The user equipment of claim 1, wherein the memory module is a virtual memory module.

5. The user equipment of claim 1, wherein the user equipment is one of a mobile phone, a laptop computer, a notebook computer, a tablet computer, a personal digital assistant (PDA), a media player, a headset computer, a wearable computer, a game console, an Internet digital media streaming device, a portable storage device, a hotspot, a 2.5 Wi-Fi translator, an Internet of Things (IoT) device, or another portable network/communications capable device.

6. The user equipment of claim 1, wherein the application further:
periodically transmits a message to a lost-and-stolen server associated with a lost-and-stolen database to inquire whether the UE is stolen,
responsive to a reply from the lost-and-stolen server indicating that the UE is lost, changes a network access key of the UE, wherein the network access key grants network access to the UE, and
responsive to no reply from the lost-and-stolen server within a predefined period of time based on clock signals from the second clock component, changes the network access key of the UE.

7. The user equipment of claim 6, wherein the application transmits the message to the lost-and-stolen server periodically using a dedicated secure communication channel via a radio transceiver of the UE.

8. The user equipment of claim 7, wherein access of applications stored outside the trusted security zone to the radio transceiver is blocked while transmitting the message.

9. The user equipment of claim 7, wherein the UE establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

10. The user equipment of claim 7, wherein the dedicated secure communication channel utilizes a dedicated communication protocol stack.

11. The user equipment of claim 6, wherein the memory module is a physical SIM or a virtual SIM.

12. The user equipment of claim 11, wherein in the case of a physical SIM, the SIM is removable or integrated in a motherboard of the UE.

13. The user equipment of claim 1, wherein the application further:
   monitors activities of applications outside the memory module on the UE, and
   responsive to an input to the UE via an application outside the memory module to connect to a website that is on a blacklist stored on the UE, blocks link of the application to a radio transceiver of the UE to access the blacklisted website.

14. The user equipment of claim 13, wherein parental control policies are stored in the memory module.

15. The user equipment of claim 14, wherein one parental control policy prevents texting in restricted time periods.

16. The user equipment of claim 13, wherein the UE establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

17. The user equipment of claim 13, wherein the memory module is a physical SIM or a virtual SIM.

* * * * *